US012033597B2

(12) United States Patent
Guo et al.

(10) Patent No.: US 12,033,597 B2
(45) Date of Patent: Jul. 9, 2024

(54) METHOD AND DEVICE FOR ELIMINATING BRIGHTNESS MURA DEFECT OF LIQUID CRYSTAL DISPLAY

(71) Applicants: Haining ESWIN IC Design Co., Ltd., Zhejiang (CN); Beijing ESWIN Computing Technology Co., Ltd., Beijing (CN)

(72) Inventors: Meng Guo, Zhejiang (CN); Qiqiang Han, Zhejiang (CN)

(73) Assignees: Haining ESWIN IC Design Co., Ltd., Jiaxing (CN); Beijing ESWIN Computing Technology Co., Ltd., Beijing (CN)

( * ) Notice: Subject to any disclaimer, the term of this patent is extended or adjusted under 35 U.S.C. 154(b) by 0 days.

(21) Appl. No.: 18/061,426

(22) Filed: Dec. 2, 2022

(65) Prior Publication Data

US 2023/0096842 A1 Mar. 30, 2023

(30) Foreign Application Priority Data

Dec. 17, 2021 (CN) ......................... 202111551272.7

(51) Int. Cl.
*G09G 3/36* (2006.01)

(52) U.S. Cl.
CPC ... *G09G 3/3607* (2013.01); *G09G 2320/0233* (2013.01); *G09G 2360/16* (2013.01)

(58) Field of Classification Search
CPC ... G09G 2320/0233; G09G 2320/0295; G09G 2320/0693
See application file for complete search history.

(56) References Cited

U.S. PATENT DOCUMENTS

2014/0104305 A1* 4/2014 Ryu .................... G09G 3/3208 345/589
2015/0262524 A1* 9/2015 Choe .................... G09G 3/3233 345/77
2019/0362671 A1* 11/2019 Kuki .................... G09G 3/2007

* cited by examiner

*Primary Examiner* — Van N Chow

(57) ABSTRACT

The present application discloses a method and a device for eliminating a brightness mura defect of a liquid crystal display, and relates to the technical field of liquid crystal displays. The method disclosed by the present application includes the following steps: acquiring an image to be displayed, wherein the image to be displayed includes a plurality of pixels; determining a compensation coefficient corresponding to each channel of each of the pixels according to an original gray scale value corresponding to each channel of each of the pixels; calculating a compensation gray scale value corresponding to each channel of each of the pixels according to the original gray scale value and the compensation coefficient corresponding to each channel of each of the pixels; and outputting and displaying the image to be displayed according to the compensation gray scale value corresponding to each channel of each of the pixels.

10 Claims, 3 Drawing Sheets

METHOD AND DEVICE FOR ELIMINATING BRIGHTNESS MURA DEFECT OF LIQUID CRYSTAL DISPLAY

TECHNICAL FIELD

The present application relates to the technical field of liquid crystal displays, and more particularly relates to a method and a device for eliminating a brightness mural defect of a liquid crystal display.

BACKGROUND ART

Because of defects in the manufacturing process of liquid crystal displays, the backlight distribution of the liquid crystal displays produced is often uneven. However, the uneven backlight distribution of the liquid crystal displays will lead to the brightness mura defect of the liquid crystal displays, that is, the brightness of the liquid crystal display is uneven. When the liquid crystal displays display a pure color picture, patches, and traces in some areas of the liquid crystal displays can be clearly observed by users, which will affect users' viewing experience.

Therefore, how to eliminate the brightness mura defect of the liquid crystal display is very important.

SUMMARY OF THE INVENTION

The embodiments of the present application provide a method and a device for eliminating a brightness mura defect of a liquid crystal display, which are mainly aimed at eliminating the brightness mura defect of the liquid crystal display.

In order to solve the above-mentioned technical problems, the embodiments of the present application provide the following technical solutions:

- in a first aspect, the present application provides a method for eliminating a brightness mura defect of a liquid crystal display, which is applied to a target liquid crystal display and includes the following steps:
- acquiring an image to be displayed, wherein the image to be displayed includes a plurality of pixels;
- determining a compensation coefficient corresponding to each channel of each of the pixels according to an original gray scale value corresponding to each channel of each of the pixels;
- calculating a compensation gray scale value corresponding to each channel of each of the pixels according to the original gray scale value and the compensation coefficient corresponding to each channel of each of the pixels; and
- outputting and displaying the image to be displayed according to the compensation gray scale value corresponding to each channel of each of the pixels.

Optionally, the determining a compensation coefficient corresponding to each channel of each of the pixels according to an original gray scale value corresponding to each channel of each of the pixels includes:

- searching whether there is a compensation coefficient set corresponding to each of the channels according to the original gray scale value corresponding to each channel of the pixel and a preset elimination mode;
- if so, determining the compensation coefficient corresponding to the channel according to the compensation coefficient set corresponding to the channel; and
- if not, acquiring a first adjacent gray scale compensation coefficient set and a second adjacent gray scale compensation coefficient set corresponding to the channel according to the original gray scale value corresponding to the channel and the preset elimination mode, and determining the compensation coefficient corresponding to the channel according to the first adjacent gray scale compensation coefficient set and the second adjacent gray scale compensation coefficient set.

Optionally, the determining the compensation coefficient corresponding to the channel according to the compensation coefficient set corresponding to the channel includes:

- acquiring the compensation coefficient corresponding to the channel from the compensation coefficient set corresponding to the channel when the compensation coefficient set corresponding to the channel includes the compensation coefficient corresponding to the channel;
- when the compensation coefficient set corresponding to the channel includes the compensation coefficient corresponding to each preset block, acquiring coordinate values corresponding to the pixel, acquiring a compensation coefficient corresponding to a first preset block, a compensation coefficient corresponding to a second preset block, a compensation coefficient corresponding to a third preset block, and a compensation coefficient corresponding to a fourth preset block from the compensation coefficient set corresponding to the channel, and substituting the compensation coefficient corresponding to the first preset block, the compensation coefficient corresponding to the second preset block, the compensation coefficient corresponding to the third preset block, the compensation coefficient corresponding to the fourth preset block, and the coordinate values corresponding to the pixel into a first preset formula to calculate the compensation coefficient corresponding to the channel, wherein the first preset block is a preset block where the pixel is located, the second preset block is a preset block on a right side adjacent to the first preset block, the third preset block is a preset block on a lower side adjacent to the first preset block, the fourth preset block is a preset block on a right side adjacent to the third preset block, and the coordinate values corresponding to the pixels are used to indicate the positions of the pixel in the first preset block.

Optionally, the determining the compensation coefficient corresponding to the channel according to the first adjacent gray scale compensation coefficient set and the second adjacent gray scale compensation coefficient set includes:

- when the first adjacent gray scale compensation coefficient set includes a first adjacent compensation coefficient corresponding to the channel, and the second adjacent gray scale compensation coefficient set includes a second adjacent compensation coefficient corresponding to the channel, acquiring the first adjacent compensation coefficient corresponding to the channel from the first adjacent gray scale compensation coefficient set and the second adjacent compensation coefficient corresponding to the channel from the second adjacent gray scale compensation coefficient set, substituting the first adjacent compensation coefficient, the second adjacent compensation coefficient, the original gray scale value corresponding to the channel, a first adjacent gray scale value and a second adjacent gray scale value into a second preset formula to calculate the compensation coefficient corresponding to the channel; and
- when the first adjacent gray scale compensation coefficient set includes a first adjacent compensation coefficient corresponding to each preset block, and the second adjacent gray scale compensation coefficient set includes a second adjacent compensation coefficient corresponding to each preset block, acquiring the coordinate values corresponding to the pixel, acquiring a first adjacent compensation coefficient corresponding to the first preset block, a first adjacent compensation coefficient corresponding to the second preset block, a first adjacent compensation coefficient corresponding to the third preset block and a first adjacent compensation coefficient corresponding to the fourth preset block from the first adjacent gray scale compensation coefficient set, acquiring a second adjacent compensation coefficient corresponding to the first preset block, a second adjacent compensation coefficient corresponding to the second preset block, a second adjacent compensation coefficient corresponding to the third preset block and a second adjacent compensation coefficient corresponding to the fourth preset block from the second adjacent gray scale compensation coefficient set, substituting the first adjacent compensation coefficient corresponding to the first preset block, the first adjacent compensation coefficient corresponding to the second preset block, the first adjacent compensation coefficient corresponding to the third preset block, the first adjacent compensation coefficient corresponding to the fourth preset block and the coordinate values corresponding to the pixel into a first preset formula to calculate the first adjacent compensation coefficient corresponding to the channel, substituting the second adjacent compensation coefficient corresponding to the first preset block, the second adjacent compensation coefficient corresponding to the second preset block, the second adjacent compensation coefficient corresponding to the third preset block, the second adjacent compensation coefficient corresponding to the fourth preset block and the coordinate values corresponding to the pixel into the first preset formula to calculate the second adjacent compensation coefficient corresponding to the channel, and substituting the first adjacent compensation coefficient, the second adjacent compensation coefficient, the original gray scale value corresponding to the channel, the first adjacent gray scale value and the second adjacent gray scale value into a second preset formula to calculate the compensation coefficient corresponding to the channel.

Optionally, the calculating a compensation gray scale value corresponding to each channel of each of the pixels according to the original gray scale value and the compensation coefficient corresponding to each channel of each of the pixels includes:

performing summation calculation on the original gray scale value and the compensation coefficient corresponding to the channel to acquire a calculation result; and determining the calculation result as the compensation gray scale value corresponding to the channel.

Optionally, after calculating the compensation gray scale value corresponding to each channel of each of the pixels according to the original gray scale value and the compensation coefficient corresponding to each channel of each of the pixels, the method further includes:

when the original gray scale value corresponding to any channel of any pixel is in a preset invalid gray scale interval, calculating a correction coefficient corresponding to the pixel according to the original gray scale value and the compensation gray scale value corresponding to each channel of the pixel;

calculating the product of the correction coefficient and the original gray scale value corresponding to each channel of the pixel to acquire a correction gray scale value corresponding to each channel of the pixel; and updating the compensation gray scale value corresponding to each channel of the pixel by using the correction gray scale value corresponding to each channel of the pixel.

Optionally, the calculating a correction coefficient corresponding to the pixel according to the original gray scale value and the compensation gray scale value corresponding to each channel of the pixel includes:

determining the largest channel among a plurality of channels of the pixel corresponding to the original gray scale as a target channel; and calculating the quotient of the compensation gray scale value corresponding to the target channel and the original gray scale value corresponding to the target channel to acquire the correction coefficient corresponding to the pixel.

In a second aspect, the present application provides a device for eliminating a brightness mura defect of a liquid crystal display. The device is applied to the target liquid crystal display and includes:

an acquisition unit configured for acquiring an image to be displayed, wherein the image to be displayed includes a plurality of pixels;

a determination unit configured for determining a compensation coefficient corresponding to each channel of each of the pixels according to an original gray scale value corresponding to each channel of each of the pixels;

a first calculation unit configured for calculating a compensation gray scale value corresponding to each channel of each of the pixels according to the original gray scale value and the compensation coefficient corresponding to each channel of each of the pixels; and an output unit configured for outputting and displaying the image to be displayed according to the compensation gray scale value corresponding to each channel of each of the pixels.

Optionally, the determination unit includes:

a searching module configured for searching whether there is a compensation coefficient set corresponding to each of the channels according to the original gray scale value corresponding to each channel of the pixel and a preset elimination mode;

a first determination module configured for determining the compensation coefficient corresponding to the channel according to the compensation coefficient set corresponding to the channel when there is the compensation coefficient set corresponding to the channel; and a second determination module configured for acquiring a first adjacent gray scale compensation coefficient set and a second adjacent gray scale compensation coefficient set corresponding to the channel according to the original gray scale value corresponding to the channel and the preset elimination mode, and determining the compensation coefficient corresponding to the channel according to the first adjacent gray scale compensation coefficient set and the second adjacent gray scale compensation coefficient set when there is no the compensation coefficient set corresponding to the channel.

Optionally, the first determination module specifically configured for acquiring the compensation coefficient corresponding to the channel from the compensation coefficient set corresponding to the channel when the compensation coefficient set corresponding to the channel includes the compensation coefficient corresponding to the channel; and when the compensation coefficient set corresponding to the channel includes the compensation coefficient corresponding to each preset block, acquiring the coordinate values corresponding to the pixel, acquiring a compensation coefficient corresponding to a first preset block, a compensation coefficient corresponding to a second preset block, a compensation coefficient corresponding to a third preset block, and a compensation coefficient corresponding to a fourth preset block from the compensation coefficient set corresponding to the channel, and substituting the compensation coefficient corresponding to the first preset block, the compensation coefficient corresponding to the second preset block, the compensation coefficient corresponding to the third preset block, the compensation coefficient corresponding to the fourth preset block, and the coordinate values corresponding to the pixel into a first preset formula to calculate the compensation coefficient corresponding to the channel, wherein the first preset block is a preset block where the pixel is located, the second preset block is a preset block on a right side adjacent to the first preset block, the third preset block is a preset block on a lower side adjacent to the first preset block, the fourth preset block is a preset block on a right side adjacent to the third preset block, and the coordinate values corresponding to the pixels are used to indicate the positions of the pixel in the first preset block.

Optionally, the second determination module is specifically configured for when the first adjacent gray scale compensation coefficient set includes a first adjacent compensation coefficient corresponding to the channel, and the second adjacent gray scale compensation coefficient set includes a second adjacent compensation coefficient corresponding to the channel, acquiring the first adjacent compensation coefficient corresponding to the channel from the first adjacent gray scale compensation coefficient set and the second adjacent compensation coefficient corresponding to the channel from the second adjacent gray scale compensation coefficient set, substituting the first adjacent compensation coefficient, the second adjacent compensation coefficient, the original gray scale value corresponding to the channel, a first adjacent gray scale value and a second adjacent gray scale value into a second preset formula to calculate the compensation coefficient corresponding to the channel; and when the first adjacent gray scale compensation coefficient set includes a first adjacent compensation coefficient corresponding to each preset block, and the second adjacent gray scale compensation coefficient set includes a second adjacent compensation coefficient corresponding to each preset block, acquiring the coordinate values corresponding to the pixel, acquiring a first adjacent compensation coefficient corresponding to the first preset block, a first adjacent compensation coefficient corresponding to the second preset block, a first adjacent compensation coefficient corresponding to the third preset block and a first adjacent compensation coefficient corresponding to the fourth preset block from the first adjacent gray scale compensation coefficient set, acquiring a second adjacent compensation coefficient corresponding to the first preset block, a second adjacent compensation coefficient corresponding to the second preset block, a second adjacent compensation coefficient corresponding to the third preset block and a second adjacent compensation coefficient corresponding to the fourth preset block from the second adjacent gray scale compensation coefficient set, substituting the first adjacent compensation coefficient corresponding to the first preset block, the first adjacent compensation coefficient corresponding to the second preset block, the first adjacent compensation coefficient corresponding to the third preset block, the first adjacent compensation coefficient corresponding to the fourth preset block and the coordinate values corresponding to the pixel into a first preset formula to calculate the first adjacent compensation coefficient corresponding to the channel, substituting the second adjacent compensation coefficient corresponding to the first preset block, the second adjacent compensation coefficient corresponding to the second preset block, the second adjacent compensation coefficient corresponding to the third preset block, the second adjacent compensation coefficient corresponding to the fourth preset block and the coordinate values corresponding to the pixel into the first preset formula to calculate the second adjacent compensation coefficient corresponding to the channel, and substituting the first adjacent compensation coefficient, the second adjacent compensation coefficient, the original gray scale value corresponding to the channel, the first adjacent gray scale value and the second adjacent gray scale value into a second preset formula to calculate the compensation coefficient corresponding to the channel.

Optionally, the first calculation unit includes:

a first calculation module configured for performing summation calculation on the original gray scale value and the compensation coefficient corresponding to the channel to acquire a calculation result; and a third determination module configured for determining the calculation result as the compensation gray scale value corresponding to the channel.

Optionally, the device further includes:

a second calculation unit configured for calculating a correction coefficient corresponding to the pixel according to the original gray scale value and the compensation gray scale value corresponding to each channel of the pixel when the original gray scale value corresponding to any channel of any pixel is in a preset invalid gray scale interval after the first calculation unit calculates the compensation gray scale value corresponding to each channel of each pixel according to the original gray scale value and the compensation coefficient corresponding to each channel of each pixel;

a third calculation unit configured for calculating the product of the correction coefficient and the original gray scale value corresponding to each channel of the pixel to acquire a correction gray scale value corresponding to each channel of the pixel; and an updating unit configured for updating the compensation gray scale value corresponding to each channel of the pixel by using the correction gray scale value corresponding to each channel of the pixel.

Optionally, the second calculation unit includes:

a fourth determination module configured for determining the largest channel among a plurality of channels of the pixel corresponding to the original gray scale as a target channel; and a second calculation module configured for calculating the quotient of the compensation gray scale value corresponding to the target channel and the original gray scale value corresponding to the target channel to acquire the correction coefficient corresponding to the pixel.

In a third aspect, the embodiment of the present application also provides a storage medium; the storage medium includes a stored program; and equipment on which the storage medium is located is controlled to execute the method for eliminating the brightness mura defect of the liquid crystal display of the first aspect when the program is run.

In a fourth aspect, the embodiment of the present application also provides a device for eliminating a brightness mura defect of a liquid crystal display. The device includes the storage medium, and one or more processors; the storage medium is coupled with the processors which are configured to execute program instructions stored in the storage medium; and when the program instructions are run, the method for eliminating the brightness mura defect of the liquid crystal display of the first aspect is executed.

With the above-mentioned technical solutions, the technical solutions provided by the present application have the following advantages:

the present application provides a method and a device for eliminating a brightness mura defect of a liquid crystal display; and according to the present application, after a target terminal device containing the target liquid crystal display acquires the image to be displayed, a compensation coefficient corresponding to each channel of each pixel is determined according to the original gray scale value corresponding to each channel of each pixel in the image to be displayed, then a compensation gray scale value corresponding to each channel of each pixel is calculated according to the original gray scale value and the compensation coefficient corresponding to each channel of each pixel, finally, the image to be displayed is output and displayed according to the compensation gray scale value corresponding to each channel of each pixel, and thus, the brightness mura defect of the liquid crystal display is eliminated.

The above-mentioned description is only a summary about the technical solutions of the present application. For making the technical means of the present application be understood more clearly, the present application can be implemented according to the contents of the description. Moreover, for making the above-mentioned and other purposes, characteristics, and advantages of the present application more obvious and easier to understand, specific embodiments of the present application are explained below.

BRIEF DESCRIPTION OF THE DRAWINGS

The above and other objects, features and advantages of the exemplary embodiments of the present application will become easily understandable by reading the following detailed description with reference to the accompanying drawings. In the drawings, several embodiments of the present application are illustrated by way of examples without limitation, and identical or corresponding reference numerals indicate identical or corresponding parts, in which.

DETAILED DESCRIPTION OF THE INVENTION

Exemplary embodiments of the present application will be described in more detail below with reference to the accompanying drawings. Although the drawings illustrate the exemplary embodiments of the present application, it should be understood that the present application may be implemented in various forms and should not be limited to the embodiments illustrated herein. On the contrary, these embodiments are provided for the purpose that the present application may be understood more thoroughly, and may fully convey the scope of the present application to those skilled in the art.

It should be noted that unless otherwise stated, the technical terms or scientific terms used in the present application should have the usual meanings understood by those skilled in the art to which the present application belongs.

Figure 1:
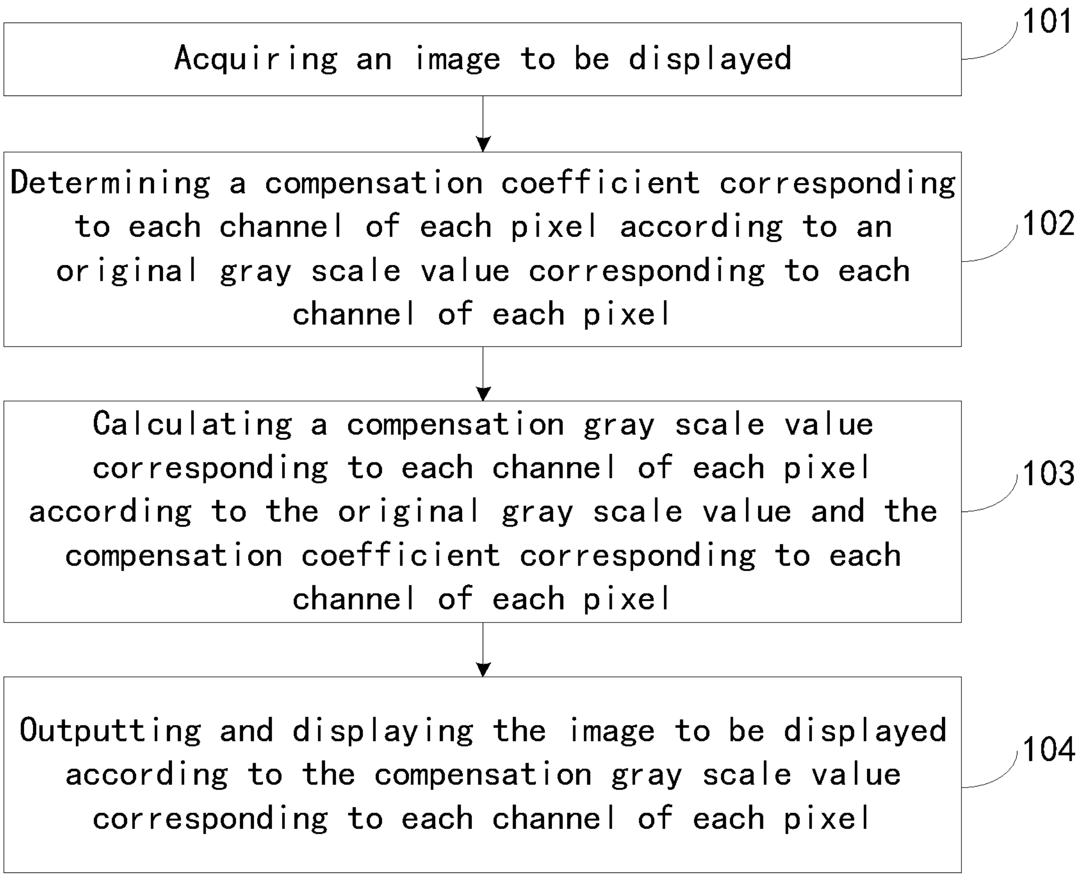
FIG. 1 shows a flow diagram of a method for eliminating a brightness mura defect of a liquid crystal display provided by an embodiment of the present application.

An embodiment of the present application provides a method for eliminating a brightness mura defect of a liquid crystal display. The method is applied to a target liquid crystal display; and as shown in FIG. 1, the method includes:

Step 101. acquiring an image to be displayed.

The image to be displayed includes a plurality of pixels, and each pixel includes a red channel, a green channel, and a blue channel. In the embodiment of the present application, an executive body in each step is a target terminal device including a target liquid crystal display, and the target terminal device may be, but is not limited to, a computer, a server and the like.

In the embodiment of the present application, when a user expects the target liquid crystal display to output and display the image to be displayed, a corresponding instruction will be output to the target terminal device, and after receiving the instruction input by the user, the target terminal device will acquire the image to be displayed according to the received instruction.

Step 102. determining a compensation coefficient corresponding to each channel of each pixel according to an original gray scale value corresponding to each channel of each pixel.

The compensation coefficients of each channel of each pixel in the target liquid crystal display at a plurality of preset gray scale values are pre-stored in the target terminal device, for example, a compensation coefficient at a 20 gray scale value, a compensation coefficient at a 40 gray scale value . . . of the red channel of a first pixel in the target liquid crystal display, a compensation coefficient at a 20 gray scale value, a compensation coefficient at a 40 gray scale value . . . of the green channel of the first pixel in the target liquid crystal display, a compensation coefficient at a 20 gray scale value, a compensation coefficient at a 40 gray scale value . . . of the blue channel of the first pixel in the target liquid crystal display, universal compensation coefficients at a 20 gray scale value, universal compensation coefficients at a 40 gray scale value . . . of the multiple channels of the first pixel in the target liquid crystal display, a compensation coefficient at a 20 gray scale value, a compensation coefficient at a 40 gray scale value . . . of the red channel of a second pixel in the target liquid crystal display, a compensation coefficient at a 20 gray scale value, a compensation coefficient at a 40 gray scale value . . . of the green channel of the second pixel in the target liquid crystal display, a compensation coefficient at a 20 gray scale value, a compensation coefficient at a 40 gray scale value . . . of the blue channel of the second pixel in the target liquid crystal display, universal compensation coefficients at a 20 gray scale value, universal compensation coefficients at a 40 gray scale value . . . of the multiple channels of the second pixel in the target liquid crystal display are pre-stored in the target terminal device.

The original gray scale value corresponding to a certain channel of any pixel in the image to be displayed is the gray scale value of the pixel under the channel extracted from the image to be displayed.

In the embodiment of the present application, after acquiring the image to be displayed, the target terminal device determines the compensation coefficient corresponding to each channel of each pixel according to the original gray scale value corresponding to each channel of each pixel in the image to be displayed Specifically, in present step, as the target terminal device may determine the mapping relationship between each pixel in the image to be displayed and each pixel in the target liquid crystal display according to the resolution of the image to be displayed and the resolution of the target liquid crystal display after acquiring the image to be displayed, the target terminal device may determine the compensation coefficient corresponding to each channel of each pixel in the image to be displayed according to the compensation coefficient of each channel of each pixel in the target liquid crystal display at a plurality of preset gray scale values and the original gray scale value corresponding to each channel of each pixel in the image to be displayed.

Step 103. calculating a compensation gray scale value corresponding to each channel of each pixel according to the original gray scale value and the compensation coefficient corresponding to each channel of each pixel.

In the embodiment of the present application, after determining the compensation coefficient corresponding to each channel of each pixel in the image to be displayed, the target terminal device needs to calculate the compensation gray scale value corresponding to each channel of each pixel according to the original gray scale value and the compensation coefficient corresponding to each channel of each pixel.

Step 104. outputting and displaying the image to be displayed according to the compensation gray scale value corresponding to each channel of each pixel.

In the embodiment of the present application, the target terminal device may output and display the image to be displayed according to the compensation gray scale value corresponding to each channel of each pixel after acquiring the compensation gray scale value corresponding to each channel of each pixel in the image to be displayed by calculating, and thus, the brightness mura defect of the target liquid crystal display is eliminated.

The present application provides the method for eliminating the brightness mura defect of the liquid crystal display; and according to the embodiment of the present application, after the target terminal device containing the target liquid crystal display acquires the image to be displayed, the compensation coefficient corresponding to each channel of each pixel is determined according to the original gray scale value corresponding to each channel of each pixel in the image to be displayed, then the compensation gray scale value corresponding to each channel of each pixel is calculated according to the original gray scale value and the compensation coefficient corresponding to each channel of each pixel, finally, the image to be displayed is output and displayed according to the compensation gray scale value corresponding to each channel of each pixel, and thus, the brightness mura defect of the target liquid crystal display is eliminated.

Figure 2:
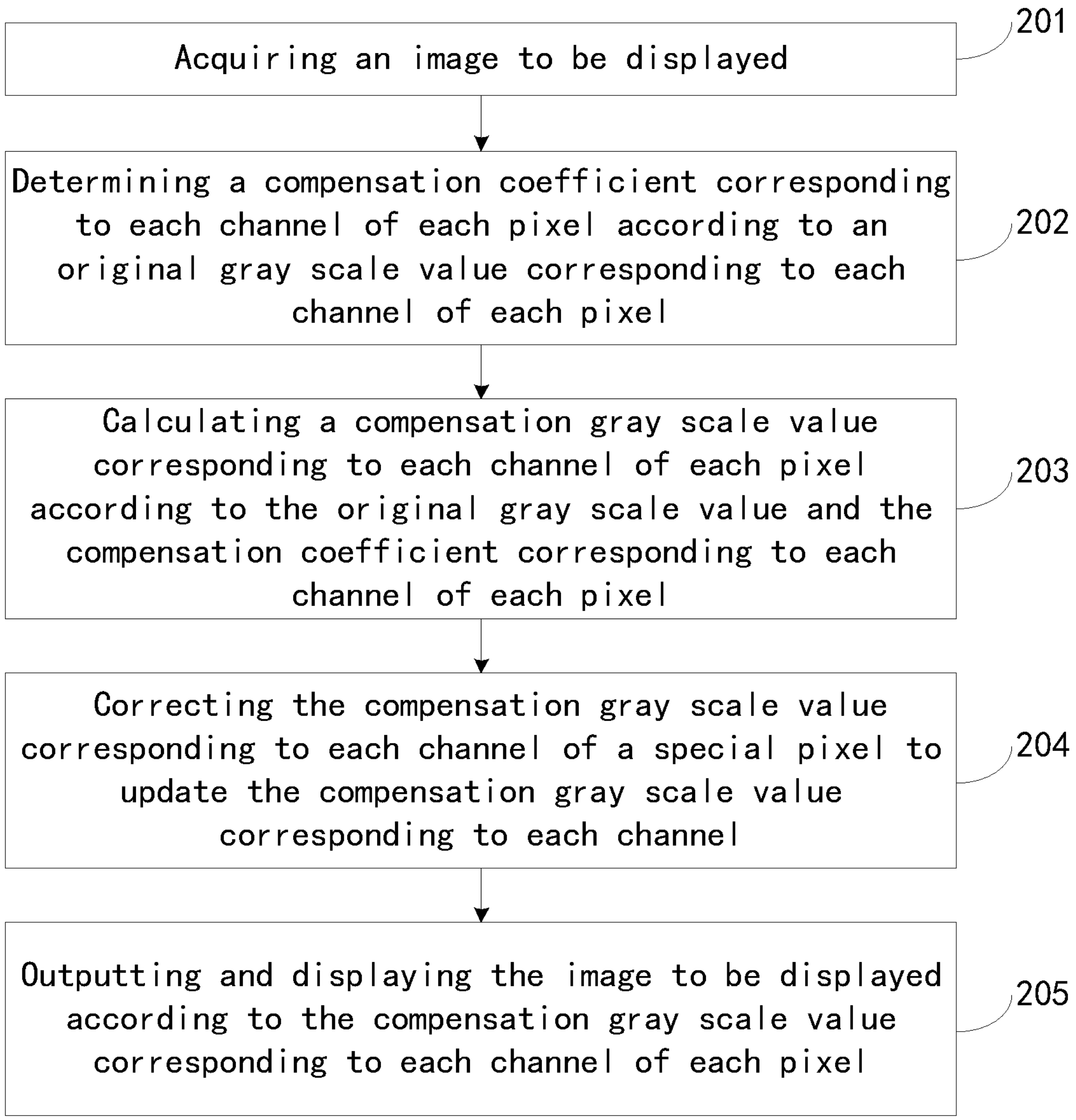
FIG. 2 shows a flow diagram of another method for eliminating a brightness mura defect of a liquid crystal display provided by an embodiment of the present application.

In order to explain in more detail below, the embodiment of the present application provides another method for eliminating a brightness mura defect of a liquid crystal display. The method is applied to the target liquid crystal display; and as shown in FIG. 2, the method includes:

Step 201. acquiring an image to be displayed.

With regard to the step 201 of acquiring the image to be displayed, refer to the description of the corresponding part of FIG. 1, and the embodiment of the present application will not be described here.

Step 202. determining a compensation coefficient corresponding to each channel of each pixel according to an original gray scale value corresponding to each channel of each pixel.

In order to ensure that the target terminal device may determine the compensation coefficient corresponding to each channel of each pixel according to the original gray scale value corresponding to each channel of each pixel in the image to be displayed after acquiring the image to be displayed, it is necessary to determine the compensation coefficient of each channel of each pixel in the target liquid crystal display in advance at a plurality of preset gray scale values. The specific process is as follows: (1) firstly, acquiring a plurality of red sample images, wherein a plurality of red sample images are a plurality of images acquired by shooting the target display by an acquisition device when the staff controls the target liquid crystal display to sequentially display a plurality of pure red images with preset gray values; secondly, determining the compensation coefficient of the red channel of each pixel in the target liquid crystal display at a plurality of preset gray scale values according to the plurality of red sample images, wherein for any red sample image corresponding to a preset gray scale value, firstly acquiring a target brightness value corresponding to the preset gray scale value, then exacting an actual brightness value corresponding to each pixel included in the red sample image from the red sample image, dividing the actual brightness value corresponding to each pixel by the target brightness value so as to acquire the compensation coefficient of the red channel of each pixel in the target liquid crystal display at the preset gray scale value, and so on, acquiring the compensation coefficient of the red channel of each pixel in the target liquid crystal display at each preset gray scale value; (2) firstly, acquiring a plurality of green sample images, wherein a plurality of green sample images are a plurality of images acquired by shooting the target display by the acquisition device when the staff controls the target liquid crystal display to sequentially display a plurality of pure green images with preset gray values; secondly, determining the compensation coefficient of the green channel of each pixel in the target liquid crystal display at a plurality of preset gray scale values according to the plurality of green sample images, wherein for any green sample image corresponding to a preset gray scale value, firstly acquiring a target brightness value corresponding to the preset gray scale value, then exacting an actual brightness value corresponding to each pixel included in the green sample image from the green sample image, dividing the actual brightness value corresponding to each pixel by the target brightness value so as to acquire the compensation coefficient of the green channel of each pixel in the target liquid crystal display at the preset gray scale value, and so on, acquiring the compensation coefficient of the green channel of each pixel in the target liquid crystal display at each preset gray scale value; (3) firstly, acquiring a plurality of blue sample images, wherein a plurality of blue sample images are a plurality of images acquired by shooting the target display by the acquisition device when the staff controls the target liquid crystal display to sequentially display a plurality of pure blue images with preset gray values; secondly, determining the compensation coefficient of the blue channel of each pixel in the target liquid crystal display at a plurality of preset gray scale values according to the plurality of blue sample images, wherein for any blue sample image corresponding to a preset gray scale value, firstly acquiring a target brightness value corresponding to the preset gray scale value, then exacting an actual brightness value corresponding to each pixel included in the blue sample image from the blue sample image, dividing the actual brightness value corresponding to each pixel by the target brightness value so as to acquire the compensation coefficient of the blue channel of each pixel in the target liquid crystal display at the preset gray scale value, and so on, acquiring the compensation coefficient of the blue channel of each pixel in the target liquid crystal display at each preset gray scale value; (4) firstly, acquiring a plurality of white sample images, wherein a plurality of white sample images are a plurality of images acquired by shooting the target display by the acquisition device when the staff controls the target liquid crystal display to sequentially display a plurality of pure white images with preset gray values; secondly, determining the compensation coefficient of the white channel of each pixel in the target liquid crystal display at a plurality of preset gray scale values according to the plurality of white sample images, wherein for any white sample image corresponding to a preset gray scale value, firstly acquiring a target brightness value corresponding to the preset gray scale value, then exacting an actual brightness value corresponding to each pixel included in the white sample image from the white sample image, dividing the actual brightness value corresponding to each pixel by the target brightness value so as to acquire the universal compensation coefficients of the multiples channel of each pixel in the target liquid crystal display at the preset gray scale value, and so on, acquiring the universal compensation coefficients of the multiple channels of each pixel in the target liquid crystal display at each preset gray scale value. It should be noted that in the actual application process, when the preset gray scale value is specifically the boundary gray scale value corresponding to the target liquid crystal display (for example, the boundary gray scale value of the 8-bit target liquid crystal display is 0 and 255), the staff may directly set the compensation coefficient corresponding to each channel of each pixel in the target liquid crystal display and the universal compensation coefficients corresponding to multiple channels of each pixel, which are not specifically limited in the embodiment of the present application.

It should be noted that after the target terminal device determines the compensation coefficient of each channel of each pixel in the target liquid crystal display at each preset gray scale value, the compensation coefficient of each channel of each pixel at each preset gray scale value may fall into the compensation coefficient set of each channel at each preset gray scale value (where the compensation coefficient set of a certain channel at a certain preset gray scale value includes the compensation coefficient of the channel of each pixel at the preset gray scale value), and then a plurality of compensation coefficient sets are stored in the local storage space; or a plurality of pixels fall into a plurality of square blocks, then the compensation coefficient of each channel of each block at each preset gray scale value are determined according to the compensation coefficient of each channel of each pixel at each preset gray scale value, and the compensation coefficient of each channel of each block at each preset gray scale value falls into a compensation coefficient set of each channel at each preset gray scale value (wherein the compensation coefficient set of a certain channel at a certain preset gray scale value includes the compensation coefficient of the channel of each block at the preset gray scale value), and then a plurality of compensation coefficient sets are stored in the local storage space, which is not specifically limited by the embodiment of the present application. Wherein for any block, according to the compensation coefficient of a certain channel of each pixel at a certain preset gray scale value, the specific way to determine the compensation coefficient of the channel of the block at the preset gray scale value may be as follows: (1) calculating the average value of the compensation coefficients corresponding to a plurality of pixels included in the block, and determining the calculation result as the compensation coefficient of the channel of the block at the preset gray scale value; and (2) randomly selecting a pixel from a plurality of pixels included in the block, and determining the compensation coefficient of the channel of the pixel at the preset gray scale value as the compensation coefficient of the channel of the block at the preset gray scale value, but it is not limited to this. After determining the universal compensation coefficients of multiple channels of each pixel in the target liquid crystal display at each preset gray scale value, the target terminal device also needs to fall the universal compensation coefficients of multiple channels of each pixel at each preset gray scale value into universal compensation coefficient sets of multiple channels at each preset gray scale value for storage by using the above method, and the specific process will not be described in detail in the embodiment of the present application.

In the embodiment of the present application, after acquiring the image to be displayed, the target terminal device determines the compensation coefficient corresponding to each channel of each pixel according to the original gray scale value corresponding to each channel of each pixel in the image to be displayed.

Specifically, in the present step, for any pixel in the image to be displayed, the target terminal device may determine the compensation coefficient corresponding to each channel of the pixel according to the original gray scale value corresponding to each channel of the pixel in the following way:

(1) searching whether there is a compensation coefficient set corresponding to each channel according to the original gray scale value corresponding to each channel of the pixel and a preset elimination mode.

The preset elimination mode may be a Color mode or a Mono mode.

In the embodiment of the present application, (1) when the preset elimination mode is specifically the Color mode, the target terminal device may first search whether there is a compensation coefficient set corresponding to the red channel of the pixel from the pre-stored compensation coefficient set of the red channel at each preset gray scale value according to the original gray scale value corresponding to the red channel of the pixel, wherein when the original gray scale value corresponding to the red channel of the pixel is the same as a certain preset gray scale value, the compensation coefficient set corresponding to the red channel of the pixel may be searched out; then search whether there is a compensation coefficient set corresponding to the green channel of the pixel from the pre-stored compensation coefficient set of the green channel at each preset gray scale value according to the original gray scale value corresponding to the green channel of the pixel, wherein when the original gray scale value corresponding to the green channel of the pixel is the same as a certain preset gray scale value, the compensation coefficient set corresponding to the green channel of the pixel may be searched out; finally search whether there is a compensation coefficient set corresponding to the blue channel of the pixel from the pre-stored compensation coefficient set of the blue channel at each preset gray scale value according to the original gray scale value corresponding to the blue channel of the pixel, wherein when the original gray scale value corresponding to the blue channel of the pixel is the same as a certain preset gray scale value, the compensation coefficient set corresponding to the blue channel of the pixel may be searched out; (2) when the preset elimination mode is specifically the Mono mode, the target terminal device may first search whether there is a compensation coefficient set corresponding to the red channel of the pixel from the pre-stored universal compensation coefficient sets of multiple channels at each preset gray scale value according to the original gray scale value corresponding to the red channel of the pixel, wherein when the original gray scale value corresponding to the red channel of the pixel is the same as a certain preset gray scale value, the compensation coefficient set corresponding to the red channel of the pixel may be searched out; then search whether there is a compensation coefficient set corresponding to the green channel of the pixel from the pre-stored universal compensation coefficient sets of multiple channels at each preset gray scale value according to the original gray scale value corresponding to the green channel of the pixel, wherein when the original gray scale value corresponding to the green channel of the pixel is the same as a certain preset gray scale value, the compensation coefficient set corresponding to the green channel of the pixel may be searched out; and finally, search whether there is a compensation coefficient set corresponding to the blue channel of the pixel from the pre-stored universal compensation coefficient sets of multiple channels at each preset gray scale value according to the original gray scale value corresponding to the blue channel of the pixel, wherein when the original gray scale value corresponding to the blue channel of the pixel is the same as a certain preset gray scale value, the compensation coefficient set corresponding to the blue channel of the pixel may be searched out.

(2) if so, determining the compensation coefficient corresponding to the channel according to the compensation coefficient set corresponding to the channel.

In the embodiment of the present application, when the compensation coefficient set corresponding to a certain channel of the pixel is searched out, the compensation coefficient corresponding to the channel may be determined according to the compensation coefficient set corresponding to the channel, and the specific process is as follows: 1. when the compensation coefficient set corresponding to the channel includes the compensation coefficient corresponding to the channel of the pixel, the compensation coefficient corresponding to the channel of the pixel may be directly acquired from the compensation coefficient set corresponding to the channel; 2. when the compensation coefficient set corresponding to the channel includes the compensation coefficient corresponding to each preset block, the coordinate values (abscissa and ordinate) corresponding to the pixel may be acquired firstly, a compensation coefficient corresponding to a first preset block, a compensation coefficient corresponding to a second preset block, a compensation coefficient corresponding to a third preset block, and a compensation coefficient corresponding to a fourth preset block are acquired from the the compensation coefficient set corresponding to the channel, and the compensation coefficient corresponding to the first preset block, the compensation coefficient corresponding to the second preset block, the compensation coefficient corresponding to the third preset block, the compensation coefficient corresponding to the fourth preset block, and the coordinate values corresponding to the pixel are substituted into a first preset formula to calculate the compensation coefficient corresponding to the channel of the pixel, wherein the first preset block is a preset block where the pixel is located, the second preset block is a preset block on a right side adjacent to the first preset block, the third preset block is a preset block on a lower side adjacent to the first preset block, the fourth preset block is a preset block on a right side adjacent to the third preset block, and the coordinate values corresponding to the pixel are used to indicate the position of the pixel in the first preset block, wherein the first preset formula is specific as follows:

$$M(x,y)=((M1\times(n-x)+M2+x)*(n-y)+(M3*(n-x)+M4*x)*y))/(n*n))$$

where M(x, y) is the compensation coefficient corresponding to the channel of the pixel, M1 is the compensation coefficient corresponding to the first preset block, M2 is the compensation coefficient corresponding to the second preset block, M3 is the compensation coefficient corresponding to the third preset block, M4 is the compensation coefficient corresponding to the fourth preset block, x is the abscissa corresponding to the pixel, y is the ordinate corresponding to the pixel, and n is the number of pixels horizontally and vertically included in each preset block. It should be noted that when the first preset block is located in the bottom row of the image to be displayed or the rightmost column of the image to be displayed, the compensation coefficient corresponding to the first preset block may be directly determined as the compensation coefficient corresponding to the channel, without performing the above calculation.

(2) if not, acquiring a first adjacent gray scale compensation coefficient set and a second adjacent gray scale compensation coefficient set corresponding to the channel according to the original gray scale value corresponding to the channel and the preset elimination mode, and determining the compensation coefficient corresponding to the channel according to the first adjacent gray scale compensation coefficient set and the second adjacent gray scale compensation coefficient set.

In the embodiment of the present application, when the compensation coefficient set corresponding to a certain channel of the pixel is not searched out, it is necessary to acquire the first adjacent gray scale compensation coefficient set and the second adjacent gray scale compensation coefficient set corresponding to the channel according to the original gray scale value corresponding to the channel and the preset elimination mode, and determine the compensation coefficient corresponding to the channel of the pixel according to the acquired first adjacent gray scale compensation coefficient set and second adjacent gray scale compensation coefficient set.

The specific process of acquiring the first adjacent gray scale compensation coefficient set and the second adjacent gray scale compensation coefficient set corresponding to the channel according to the original gray scale value corresponding to the channel and the preset elimination mode includes the following steps: firstly, determining the first adjacent gray scale value and the second adjacent gray scale value corresponding to the channel according to the original gray scale value corresponding to the channel, wherein the first adjacent gray scale value is the preset gray scale value which is smaller than the original gray scale value corresponding to the channel and closest to the original gray scale value corresponding to the channel among the multiple preset gray scale values, and the second adjacent gray scale is the preset gray scale value which is larger than the original gray scale value corresponding to the channel and closest to the original gray scale value corresponding to the channel among the multiple preset gray scale values; secondly, 1. when the preset elimination mode is specifically the Color mode, if the channel is specifically the red channel, searching the compensation coefficient set (i.e. the first adjacent gray scale compensation coefficient set) corresponding to the first adjacent gray scale value and the compensation coefficient set (i.e. the second adjacent gray scale compensation coefficient set) corresponding to the second adjacent gray scale value from the pre-stored compensation coefficient set of the red channel at each preset gray scale value, if the channel is specifically the green channel, searching the compensation coefficient set (i.e. the first adjacent gray scale compensation coefficient set) corresponding to the first adjacent gray scale value and the compensation coefficient set (i.e. the second adjacent gray scale compensation coefficient set) corresponding to the second adjacent gray scale value from the pre-stored compensation coefficient set of the green channel at each preset gray scale value, and if the channel is specifically the blue channel, searching the compensation coefficient set (i.e. the first adjacent gray scale compensation coefficient set) corresponding to the first adjacent gray scale value and the compensation coefficient set (i.e. the second adjacent gray scale compensation coefficient set) corresponding to the second adjacent gray scale value from the pre-stored compensation coefficient set of the blue channel at each preset gray scale value; and 2. when the preset elimination mode is specifically the Mono mode, searching the compensation coefficient set (i.e. the first adjacent gray scale compensation coefficient set) corresponding to the first adjacent gray scale value and the compensation coefficient set (i.e. the second adjacent gray scale compensation coefficient set) corresponding to the second adjacent gray scale value from the pre-stored universal compensation coefficient sets of multiple channels at each preset gray scale value.

The specific process of determining the compensation coefficient corresponding to the channel according to the first adjacent gray scale compensation coefficient set and the second adjacent gray scale compensation coefficient set is as follows: 1. when the first adjacent gray scale compensation coefficient set includes a first adjacent compensation coefficient corresponding to the channel (i.e. the compensation coefficient at the first adjacent gray scale value) and the second adjacent gray scale compensation coefficient set includes a second adjacent compensation coefficient corresponding to the channel (i.e. the compensation coefficient at the second adjacent gray scale value), acquiring the first adjacent compensation coefficient corresponding to the channel from the first adjacent gray scale compensation coefficient set, and the second adjacent compensation coefficient corresponding to the channel from the second adjacent gray scale compensation coefficient set, and substituting the first adjacent compensation coefficient, the second adjacent compensation coefficient, the original gray scale value corresponding to the channel, the first adjacent gray scale value and the second adjacent gray scale value into a second preset formula, so as to calculate the compensation coefficient corresponding to the channel of the pixel; 2. when the first adjacent gray scale compensation coefficient set includes a first adjacent compensation coefficient corresponding to each preset block, and the second adjacent gray scale compensation coefficient set includes a second adjacent compensation coefficient corresponding to each preset block, acquiring the coordinate values corresponding to the pixel, acquiring a first adjacent compensation coefficient corresponding to the first preset block, a first adjacent compensation coefficient corresponding to the second preset block, a first adjacent compensation coefficient corresponding to the third preset block and a first adjacent compensation coefficient corresponding to the fourth preset block from the first adjacent gray scale compensation coefficient set, acquiring a second adjacent compensation coefficient corresponding to the first preset block, a second adjacent compensation coefficient corresponding to the second preset block, a second adjacent compensation coefficient corresponding to the third preset block and a second adjacent compensation coefficient corresponding to the fourth preset block from the second adjacent gray scale compensation coefficient set, substituting the first adjacent compensation coefficient corresponding to the first preset block, the first adjacent compensation coefficient corresponding to the second preset block, the first adjacent compensation coefficient corresponding to the third preset block, the first adjacent compensation coefficient corresponding to the fourth preset block and the coordinate values corresponding to the pixel into the first preset formula to calculate the first adjacent compensation coefficient corresponding to the channel, substituting the second adjacent compensation coefficient corresponding to the first preset block, the second adjacent compensation coefficient corresponding to the second preset block, the second adjacent compensation coefficient corresponding to the third preset block, the second adjacent compensation coefficient corresponding to the fourth preset block and the coordinate values corresponding to the pixel into the first preset formula to calculate the second adjacent compensation coefficient corresponding to the channel, and substituting the first adjacent compensation coefficient, the second adjacent compensation coefficient, the original gray scale value corresponding to the channel, the first adjacent gray scale value and the second adjacent gray scale value into a second preset formula to calculate the compensation coefficient corresponding to the channel of the pixel, wherein the second preset formula is specific as follows:

$$M1 = \frac{(A3 - A1) * M2}{A3 - A2} + \frac{(A1 - A2) * M3}{A3 - A2},$$

where M1 is the compensation coefficient corresponding to the channel of the pixel, M2 is the first adjacent compensation coefficient, M3 is the second adjacent compensation coefficient, A1 is the original gray scale value corresponding to the channel, A2 is the first adjacent gray scale value and A3 is the second adjacent gray scale value.

The target terminal device may determine the compensation coefficient corresponding to each channel of each pixel in the image to be displayed by adopting the above method.

Step 203. calculating a compensation gray scale value corresponding to each channel of each pixel according to the original gray scale value and the compensation coefficient corresponding to each channel of each pixel.

In the embodiment of the present application, after determining the compensation coefficient corresponding to each channel of each pixel in the image to be displayed, the target terminal device needs to calculate the compensation gray scale value corresponding to each channel of each pixel according to the original gray scale value and the compensation coefficient corresponding to each channel of each pixel.

Specifically, in the present step, for any channel of any pixel in the image to be displayed, the target terminal device needs to perform summation calculation on the original gray scale value and the compensation coefficient corresponding to the channel, and then determine the acquired calculation result as the compensation gray scale value corresponding to the channel.

Step 204. correcting the compensation gray scale value corresponding to each channel of a special pixel to update the compensation gray scale value corresponding to each channel.

In the embodiment of the present application, when the original gray scale value corresponding to any channel of any pixel in the image to be displayed is in a preset invalid gray scale interval, the pixel is determined as the special pixel, and the compensation gray scale value corresponding to each channel of the pixel needs to be corrected to update the compensation gray scale value corresponding to each channel of the pixel. The specific process is as follows: firstly, calculating the correction coefficient corresponding to the pixel according to the original gray scale value and the compensation gray scale value corresponding to each channel of the pixel, that is, determining the largest channel corresponding to the original gray scale value among multiple channels of the pixel as the target channel at first, and then calculating the quotient of the compensation gray scale value corresponding to the target channel and the original gray scale value corresponding to the target channel so as to acquire the correction coefficient corresponding to the pixel; secondly, calculating the product of the correction coefficient and the original gray scale value corresponding to each channel of the pixel so as to acquire the correction gray scale value corresponding to each channel of the pixel; and finally, using the correction gray scale value corresponding to each channel of the pixel to update the compensation gray scale value corresponding to each channel of the pixel, wherein the preset invalid gray scale interval may be, but are not limited to, [0,20], [0,30], [240,255], [230,255] and so on.

It should be noted that in the actual application process, if the original gray scale values corresponding to each channel of a pixel in the image to be displayed are all in the preset invalid gray scale interval, there is no need to correct the compensation gray scale values corresponding to each channel of the pixel.

Step 205. outputting and displaying the image to be displayed according to the compensation gray scale value corresponding to each channel of each pixel.

With regard to the step 205 of outputting and displaying the image to be displayed according to the compensation gray scale value corresponding to each channel of each pixel, refer to the description of the corresponding part in FIG. 1, and the embodiment of the present application will not be described here.

In order to achieve the above objective, according to another aspect of the present application, the embodiment of the present application also provides a storage medium; the storage medium includes a stored program; and equipment on which the storage medium is located is controlled to execute the above-mentioned method for eliminating the brightness mura defect of the liquid crystal display when the program is run.

In order to achieve the above objective, according to another aspect of the present application, the embodiment of the present application also provides a device for eliminating a brightness mura defect of a liquid crystal display. The device includes the storage medium, and one or more processors, wherein the storage medium is coupled with the processors which are configured to execute program instructions stored in the storage medium; and when the program instructions are run, the above-mentioned method for eliminating the brightness mura defect of the liquid crystal display is executed.

Figure 3:
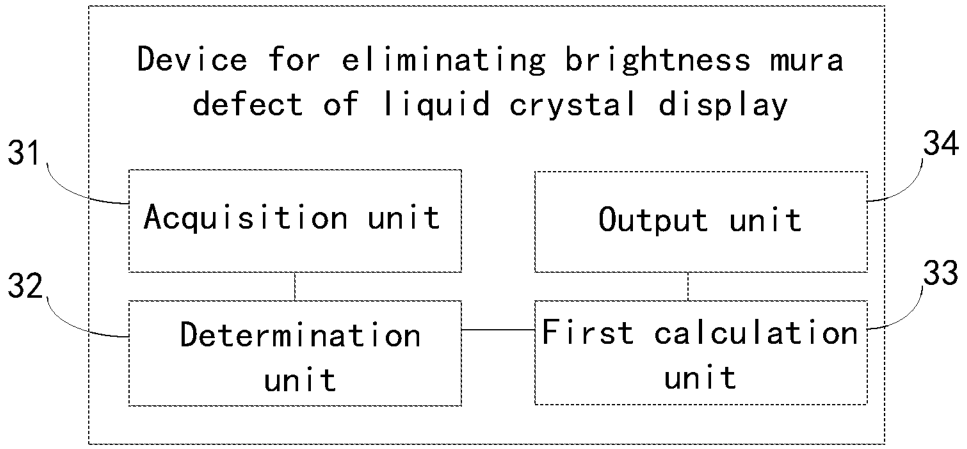
FIG. 3 shows a composition block diagram of a device for eliminating a brightness mura defect of a liquid crystal display provided by an embodiment of the present application.

Further, as an implementation of the above methods shown in FIG. 1 and FIG. 2, another embodiment of the present application also provides the device for eliminating the brightness mura defect of the liquid crystal display. The device embodiment corresponds to the above-mentioned method embodiment. For the convenience of reading, the device embodiment will not repeat the details of the above-mentioned method embodiment one by one, but it should be clear that the device in the present embodiment may correspondingly realize all the contents in the above-mentioned method embodiment. The device is used for eliminating the brightness mura defect of the liquid crystal display; and as shown in FIG. 3, the device includes:

- an acquisition unit 31 configured for acquiring an image to be displayed, wherein the image to be displayed includes a plurality of pixels;
- a determination unit 32 configured for determining a compensation coefficient corresponding to each channel of each of the pixels according to an original gray scale value corresponding to each channel of each of the pixels;
- a first calculation unit 33 configured for calculating a compensation gray scale value corresponding to each channel of each of the pixels according to the original gray scale value and the compensation coefficient corresponding to each channel of each of the pixels; and
- an output unit 34 configured for outputting and displaying the image to be displayed according to the compensation gray scale value corresponding to each channel of each of the pixels.

Figure 4:
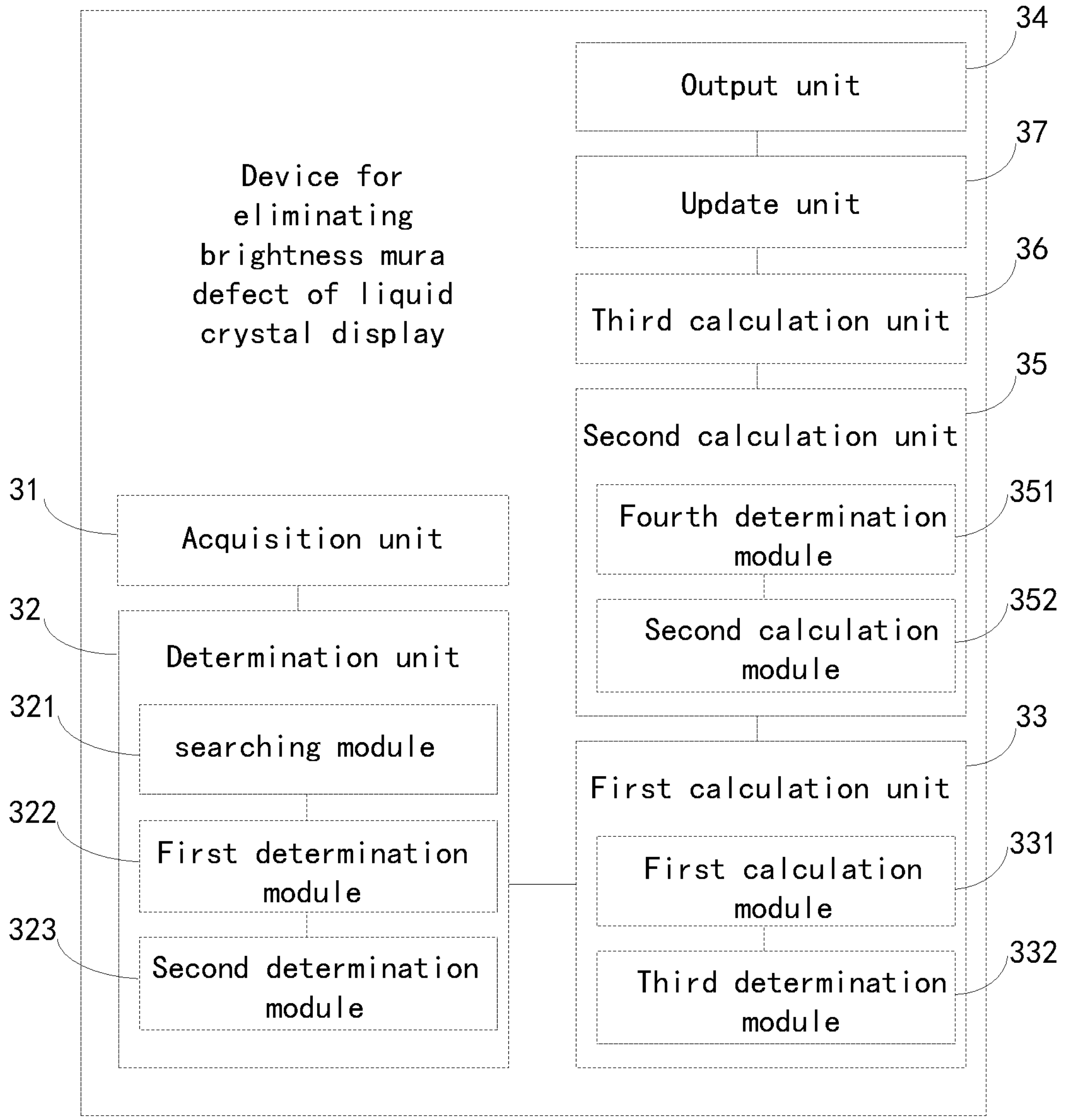
FIG. 4 shows a composition block diagram of another device for eliminating a brightness mura defect of a liquid crystal display provided by an embodiment of the present application.

Further, as shown in FIG. 4, the determination unit 32 includes:

- a searching module 321 configured for searching whether there is a compensation coefficient set corresponding to each of the channels according to the original gray scale value corresponding to each channel of the pixel and a preset elimination mode;
- a first determination module 322 configured for determining the compensation coefficient corresponding to the channel according to the compensation coefficient set corresponding to the channel when there is the compensation coefficient set corresponding to the channel;
- a second determination module 323 configured for acquiring a first adjacent gray scale compensation coefficient set and a second adjacent gray scale compensation coefficient set corresponding to the channel according to the original gray scale value corresponding to the channel and the preset elimination mode 323, and determining the compensation coefficient corresponding to the channel according to the first adjacent gray scale compensation coefficient set and the second adjacent gray scale compensation coefficient set when there is no the compensation coefficient set corresponding to the channel.

Further, as shown in FIG. 4, the first determination module 322 is specifically configured for acquiring the compensation coefficient corresponding to the channel from the compensation coefficient set corresponding to the channel when the compensation coefficient set corresponding to the channel includes the compensation coefficient corresponding to the channel; and when the compensation coefficient set corresponding to the channel includes the compensation coefficient corresponding to each preset block, acquiring the coordinate values corresponding to the pixel, acquiring a compensation coefficient corresponding to a first preset block, a compensation coefficient corresponding to a second preset block, a compensation coefficient corresponding to a third preset block, and a compensation coefficient corresponding to a fourth preset block from the compensation coefficient set corresponding to the channel, and substituting the compensation coefficient corresponding to the first preset block, the compensation coefficient corresponding to the second preset block, the compensation coefficient corresponding to the third preset block, the compensation coefficient corresponding to the fourth preset block, and the coordinate values corresponding to the pixel into a first preset formula to calculate the compensation coefficient corresponding to the channel, wherein the first preset block is a preset block where the pixel is located, the second preset block is a preset block on a right side adjacent to the first preset block, the third preset block is a preset block on a lower side adjacent to the first preset block, the fourth preset block is a preset block on a right side adjacent to the third preset block, and the coordinate values corresponding to the pixel are used to indicate the positions of the pixel in the first preset block.

Further, as shown in FIG. 4, the second determination module 322 is specifically configured for when the first adjacent gray scale compensation coefficient set includes a first adjacent compensation coefficient corresponding to the channel, and the second adjacent gray scale compensation coefficient set includes a second adjacent compensation coefficient corresponding to the channel, acquiring the first adjacent compensation coefficient corresponding to the channel from the first adjacent gray scale compensation coefficient set and the second adjacent compensation coefficient corresponding to the channel from the second adjacent gray scale compensation coefficient set, substituting the first adjacent compensation coefficient, the second adjacent compensation coefficient, the original gray scale value corresponding to the channel, the first adjacent gray scale value and the second adjacent gray scale value into a second preset formula to calculate the compensation coefficient corresponding to the channel; and when the first adjacent gray scale compensation coefficient set includes a first adjacent compensation coefficient corresponding to each preset block, and the second adjacent gray scale compensation coefficient set includes a second adjacent compensation coefficient corresponding to each preset block, acquiring the coordinate values corresponding to the pixel, acquiring a first adjacent compensation coefficient corresponding to the first preset block, a first adjacent compensation coefficient corresponding to the second preset block, a first adjacent compensation coefficient corresponding to the third preset block and a first adjacent compensation coefficient corresponding to the fourth preset block from the first adjacent gray scale compensation coefficient set, acquiring a second adjacent compensation coefficient corresponding to the first preset block, a second adjacent compensation coefficient corresponding to the second preset block, a second adjacent compensation coefficient corresponding to the third preset block and a second adjacent compensation coefficient corresponding to the fourth preset block from the second adjacent gray scale compensation coefficient set, substituting the first adjacent compensation coefficient corresponding to the first preset block, the first adjacent compensation coefficient corresponding to the second preset block, the first adjacent compensation coefficient corresponding to the third preset block, the first adjacent compensation coefficient corresponding to the fourth preset block and the coordinate values corresponding to the pixel into a first preset formula to calculate the first adjacent compensation coefficient corresponding to the channel, substituting the second adjacent compensation coefficient corresponding to the first preset block, the second adjacent compensation coefficient corresponding to the second preset block, the second adjacent compensation coefficient corresponding to the third preset block, the second adjacent compensation coefficient corresponding to the fourth preset block and the coordinate values corresponding to the pixel into the first preset formula to calculate the second adjacent compensation coefficient corresponding to the channel, and substituting the first adjacent compensation coefficient, the second adjacent compensation coefficient, the original gray scale value corresponding to the channel, the first adjacent gray scale value and the second adjacent gray scale value into a second preset formula to calculate the compensation coefficient corresponding to the channel.

Further, as shown in FIG. 4, the first calculation unit 33 includes:

a first calculation module 331 configured for performing summation calculation on the original gray scale value and the compensation coefficient corresponding to the channel to acquire a calculation result; and a third determination module 332 configured for determining the calculation result as the compensation gray scale value corresponding to the channel.

Further, as shown in FIG. 4, the device includes:

a second calculation unit 35 configured for calculating a correction coefficient corresponding to the pixel according to the original gray scale value and the compensation gray scale value corresponding to each channel of the pixel when the original gray scale value corresponding to any channel of any pixel is in a preset invalid gray scale interval after the first calculation unit 33 calculates the compensation gray scale value corresponding to each channel of each pixel according to the original gray scale value and the compensation coefficient corresponding to each channel of each pixel;

a third calculation unit 36 configured for calculating the product of the correction coefficient and the original gray scale value corresponding to each channel of the pixel to acquire a correction gray scale value corresponding to each channel of the pixel; and an updating unit 37 configured for updating the compensation gray scale value corresponding to each channel of the pixel by using the correction gray scale value corresponding to each channel of the pixel.

Further, as shown in FIG. 4, the calculation unit 35 includes:

a fourth determination module 351 configured for determining the largest channel among multiple channels of the pixel corresponding to the original gray scale as a target channel; and a second calculation module 352 configured for calculating the quotient of the compensation gray scale value corresponding to the target channel and the original gray scale value corresponding to the target channel to acquire the correction coefficient corresponding to the pixel.

The present application provides the method and the device for eliminating the brightness mura defect of the liquid crystal display; and according to the embodiments of the present application, after the target terminal device containing the target liquid crystal display acquires the image to be displayed, the compensation coefficient corresponding to each channel of each pixel is determined according to the original gray scale value corresponding to each channel of each pixel in the image to be displayed, then the compensation gray scale value corresponding to each channel of each pixel is calculated according to the original gray scale value and the compensation coefficient corresponding to each channel of each pixel, finally, the image to be displayed is output and displayed according to the compensation gray scale value corresponding to each channel of each pixel, and thus, the brightness mura defect of the target liquid crystal display is eliminated.

The device for eliminating the brightness mura defect of liquid crystal display includes a processor and a memory; the acquisition unit, the determination unit, the first calculation unit, the output unit and the like are all stored in the memory as program units; and the processor executes the program units stored in the memory to realize corresponding functions.

The processor includes a kernel which is used for retrieving the corresponding program units from the memory. One or more kernels may be set, and the brightness mura defect of the liquid crystal display may be eliminated by adjusting kernel parameters.

The embodiment of the present application also provides a storage medium; the storage medium includes a stored program; and equipment on which the storage medium is located is controlled to execute the above-mentioned method for eliminating the brightness mura defect of the liquid crystal display when the program is run.

The storage medium may include forms of a volatile memory, a random access memory (RAM) and/or a non-volatile memory in computer-readable media, e.g., a read-only memory (ROM) or a flash RAM. The memory includes at least one storage chip.

The embodiment of the present application also provides a device for eliminating a brightness mura defect of a liquid crystal display. The device includes the storage medium, and one or more processors, wherein the storage medium is coupled with the processors which are configured to execute program instructions stored in the storage medium; and when the program instructions are run, the above-mentioned method for eliminating the brightness mura defect of the liquid crystal display is executed.

The embodiment of the present application provides equipment. The equipment includes a processor, a memory, and a program stored on the memory and runnable on the processor. When executing the program, the processor implements the following steps:

acquiring an image to be displayed, wherein the image to be displayed includes a plurality of pixels;

determining a compensation coefficient corresponding to each channel of each of the pixels according to an original gray scale value corresponding to each channel of each of the pixels;

calculating a compensation gray scale value corresponding to each channel of each of the pixels according to the original gray scale value and the compensation coefficient corresponding to each channel of each of the pixels; and outputting and displaying the image to be displayed according to the compensation gray scale value corresponding to each channel of each of the pixels Further, the determining a compensation coefficient corresponding to each channel of each of the pixels according to an original gray scale value corresponding to each channel of each of the pixels includes:

searching whether there is a compensation coefficient set corresponding to each of the channels according to the original gray scale value corresponding to each channel of the pixel and a preset elimination mode;

if so, determining the compensation coefficient corresponding to the channel according to the compensation coefficient set corresponding to the channel;

if not, acquiring a first adjacent gray scale compensation coefficient set and a second adjacent gray scale compensation coefficient set corresponding to the channel according to the original gray scale value corresponding to the channel and the preset elimination mode, and determining the compensation coefficient corresponding to the channel according to the first adjacent gray scale compensation coefficient set and the second adjacent gray scale compensation coefficient set.

Further, the determining the compensation coefficient corresponding to the channel according to the compensation coefficient set corresponding to the channel includes:

acquiring the compensation coefficient corresponding to the channel from the compensation coefficient set corresponding to the channel when the compensation coefficient set corresponding to the channel includes the compensation coefficient corresponding to the channel; and when the compensation coefficient set corresponding to the channel includes the compensation coefficient corresponding to each preset block, acquiring the coordinate values corresponding to the pixel, acquiring a compensation coefficient corresponding to a first preset block, a compensation coefficient corresponding to a second preset block, a compensation coefficient corresponding to a third preset block, and a compensation coefficient corresponding to a fourth preset block from the compensation coefficient set corresponding to the channel, and substituting the compensation coefficient corresponding to the first preset block, the compensation coefficient corresponding to the second preset block, the compensation coefficient corresponding to the third preset block, the compensation coefficient corresponding to the fourth preset block, and the coordinate values corresponding to the pixel into a first preset formula to calculate the compensation coefficient corresponding to the channel, wherein the first preset block is a preset block where the pixel is located, the second preset block is a preset block on a right side adjacent to the first preset block, the third preset block is a preset block on a lower side adjacent to the first preset block, the fourth preset block is a preset block on a right side adjacent to the third preset block, and the coordinate values corresponding to the pixel are used to indicate the positions of the pixel in the first preset block.

Further, the determining the compensation coefficient corresponding to the channel according to the first adjacent gray scale compensation coefficient set and the second adjacent gray scale compensation coefficient set includes:

when the first adjacent gray scale compensation coefficient set includes a first adjacent compensation coefficient corresponding to the channel, and the second adjacent gray scale compensation coefficient set includes a second adjacent compensation coefficient corresponding to the channel, acquiring the first adjacent compensation coefficient corresponding to the channel from the first adjacent gray scale compensation coefficient set and the second adjacent compensation coefficient corresponding to the channel from the second adjacent gray scale compensation coefficient set, substituting the first adjacent compensation coefficient, the second adjacent compensation coefficient, the original gray scale value corresponding to the channel, the first adjacent gray scale value and the second adjacent gray scale value into a second preset formula to calculate the compensation coefficient corresponding to the channel; and when the first adjacent gray scale compensation coefficient set includes a first adjacent compensation coefficient corresponding to each preset block, and the second adjacent gray scale compensation coefficient set includes a second adjacent compensation coefficient corresponding to each preset block, acquiring the coordinate values corresponding to the pixel, acquiring a first adjacent compensation coefficient corresponding to the first preset block, a first adjacent compensation coefficient corresponding to the second preset block, a first adjacent compensation coefficient corresponding to the third preset block and a first adjacent compensation coefficient corresponding to the fourth preset block from the first adjacent gray scale compensation coefficient set, acquiring a second adjacent compensation coefficient corresponding to the first preset block, a second adjacent compensation coefficient corresponding to the second preset block, a second adjacent compensation coefficient corresponding to the third preset block and a second adjacent compensation coefficient corresponding to the fourth preset block from the second adjacent gray scale compensation coefficient set, substituting the first adjacent compensation coefficient corresponding to the first preset block, the first adjacent compensation coefficient corresponding to the second preset block, the first adjacent compensation coefficient corresponding to the third preset block, the first adjacent compensation coefficient corresponding to the fourth preset block and the coordinate values corresponding to the pixel into a first preset formula to calculate the first adjacent compensation coefficient corresponding to the channel, substituting the second adjacent compensation coefficient corresponding to the first preset block, the second adjacent compensation coefficient corresponding to the second preset block, the second adjacent compensation coefficient corresponding to the third preset block, the second adjacent compensation coefficient corresponding to the fourth preset block and the coordinate values corresponding to the pixel into the first preset formula to calculate the second adjacent compensation coefficient corresponding to the channel, and substituting the first adjacent compensation coefficient, the second adjacent compensation coefficient, the original gray scale value corresponding to the channel, the first adjacent gray scale value and the second adjacent gray scale value into a second preset formula to calculate the compensation coefficient corresponding to the channel.

performing summation calculation on the original gray scale value and the compensation coefficient corresponding to the channel to acquire a calculation result; and determining the calculation result as the compensation gray scale value corresponding to the channel.

Further, after calculating the compensation gray scale value corresponding to each channel of each of the pixels according to the original gray scale value and the compensation coefficient corresponding to each channel of each of the pixels, the method further includes:

when the original gray scale value corresponding to any channel of any pixel is in a preset invalid gray scale interval, calculating a correction coefficient corresponding to the pixel according to the original gray scale value and the compensation gray scale value corresponding to each channel of the pixel;

calculating the product of the correction coefficient and the original gray scale value corresponding to each channel of the pixel to acquire a correction gray scale value corresponding to each channel of the pixel;

updating the compensation gray scale value corresponding to each channel of the pixel by using the correction gray scale value corresponding to each channel of the pixel.

Further, the calculating a correction coefficient corresponding to the pixel according to the original gray scale value and the compensation gray scale value corresponding to each channel of the pixel includes:

determining the largest channel among multiple channels of the pixel corresponding to the original gray scale as a target channel; and calculating the quotient of the compensation gray scale value corresponding to the target channel and the original gray scale value corresponding to the target channel to acquire the correction coefficient corresponding to the pixel.

The present application also provides a computer program product; and when executed on a data processing device, the computer program product is suitable for executing program codes that initialize the following method steps: acquiring an image to be displayed, wherein the image to be displayed includes a plurality of pixels; determining a compensation coefficient corresponding to each channel of each of the pixels according to an original gray scale value corresponding to each channel of each of the pixels; calculating a compensation gray scale value corresponding to each channel of each of the pixels according to the original gray scale value and the compensation coefficient corresponding to each channel of each of the pixels; and outputting and displaying the image to be displayed according to the compensation gray scale value corresponding to each channel of each of the pixels.

Those skilled in the art should understand that the embodiments of the present application may be provided as a method, a system or a computer program product. Therefore, the embodiments of the present application may be implemented in forms of full hardware, full software, combination of software and hardware. And the present application may be implemented in a form of a computer program product capable of being implemented on available computer memory media (containing but not limited to disk memory, CD-ROM, optical memory, etc.) containing one or more available computer program codes.

The foregoing is only a preferred embodiment of the present application and is not intended to limit the present application. For those skilled in the art, the present application may have various modifications and changes. Any modification, equivalent replacement, or improvement made without departing from the spirit and principle of the present application shall fall within the protection scope of the claims of the present application.

What is claimed is:

1. A method for eliminating a brightness mura defect of a liquid crystal display, the method being applied to a target liquid crystal display and comprising:

acquiring an image to be displayed, wherein the image to be displayed comprises a plurality of pixels;

determining a compensation coefficient corresponding to each channel of each of the pixels according to an original gray scale value corresponding to each channel of each of the pixels;

calculating a compensation gray scale value corresponding to each channel of each of the pixels according to the original gray scale value and the compensation coefficient corresponding to each channel of each of the pixels; and outputting and displaying the image to be displayed according to the compensation gray scale value corresponding to each channel of each of the pixels;

the determining a compensation coefficient corresponding to each channel of each of the pixels according to an original gray scale value corresponding to each channel of each of the pixels comprises:

searching whether there is a compensation coefficient set corresponding to each of the channels according to the original gray scale value corresponding to each channel of the pixel and a preset elimination mode;

if so, determining the compensation coefficient corresponding to the channel according to the compensation coefficient set corresponding to the channel;

if not, acquiring a first adjacent gray scale compensation coefficient set and a second adjacent gray scale compensation coefficient set corresponding to the channel according to the original gray scale value corresponding to the channel and the preset elimination mode, and determining the compensation coefficient corresponding to the channel according to the first adjacent gray scale compensation coefficient set and the second adjacent gray scale compensation coefficient set.

2. The method of claim 1, wherein the determining the compensation coefficient corresponding to the channel according to the compensation coefficient set corresponding to the channel comprises:

acquiring the compensation coefficient corresponding to the channel from the compensation coefficient set corresponding to the channel when the compensation coefficient set corresponding to the channel comprises the compensation coefficient corresponding to the channel; and when the compensation coefficient set corresponding to the channel comprises the compensation coefficient corresponding to each preset block, acquiring the coordinate values corresponding to the pixel, acquiring a compensation coefficient corresponding to a first preset block, a compensation coefficient corresponding to a second preset block, a compensation coefficient corresponding to a third preset block, and a compensation coefficient corresponding to a fourth preset block from the compensation coefficient set corresponding to the channel, and substituting the compensation coefficient corresponding to the first preset block, the compensation coefficient corresponding to the second preset block, the compensation coefficient corresponding to the third preset block, the compensation coefficient corresponding to the fourth preset block, and the coordinate values corresponding to the pixel into a first preset formula to calculate the compensation coefficient corresponding to the channel, wherein the first preset block is a preset block where the pixel is located, the second preset block is a preset block on a right side adjacent to the first preset block, the third preset block is a preset block on a lower side adjacent to the first preset block, the fourth preset block is a preset block on a right side adjacent to the third preset block, and the coordinate values corresponding to the pixels are used to indicate the positions of the pixel in the first preset block.

3. The method of claim 1, wherein the determining the compensation coefficient corresponding to the channel according to the first adjacent gray scale compensation coefficient set and the second adjacent gray scale compensation coefficient set comprises:

when the first adjacent gray scale compensation coefficient set comprises a first adjacent compensation coefficient corresponding to the channel, and the second adjacent gray scale compensation coefficient set comprises a second adjacent compensation coefficient corresponding to the channel, acquiring the first adjacent compensation coefficient corresponding to the channel from the first adjacent gray scale compensation coefficient set and the second adjacent compensation coefficient corresponding to the channel from the second adjacent gray scale compensation coefficient set, substituting the first adjacent compensation coefficient, the second adjacent compensation coefficient, the original gray scale value corresponding to the channel, a first adjacent gray scale value and a second adjacent gray scale value into a second preset formula to calculate the compensation coefficient corresponding to the channel; and when the first adjacent gray scale compensation coefficient set comprises a first adjacent compensation coefficient corresponding to each preset block, and the second adjacent gray scale compensation coefficient set comprises a second adjacent compensation coefficient corresponding to each preset block, acquiring the coordinate values corresponding to the pixel, acquiring a first adjacent compensation coefficient corresponding to the first preset block, a first adjacent compensation coefficient corresponding to the second preset block, a first adjacent compensation coefficient corresponding to the third preset block and a first adjacent compensation coefficient corresponding to the fourth preset block from the first adjacent gray scale compensation coefficient set, acquiring a second adjacent compensation coefficient corresponding to the first preset block, a second adjacent compensation coefficient corresponding to the second preset block, a second adjacent compensation coefficient corresponding to the third preset block and a second adjacent compensation coefficient corresponding to the fourth preset block from the second adjacent gray scale compensation coefficient set, substituting the first adjacent compensation coefficient corresponding to the first preset block, the first adjacent compensation coefficient corresponding to the second preset block, the first adjacent compensation coefficient corresponding to the third preset block, the first adjacent compensation coefficient corresponding to the fourth preset block and the coordinate values corresponding to the pixel into a first preset formula to calculate the first adjacent compensation coefficient corresponding to the channel, substituting the second adjacent compensation coefficient corresponding to the first preset block, the second adjacent compensation coefficient corresponding to the second preset block, the second adjacent compensation coefficient corresponding to the third preset block, the second adjacent compensation coefficient corresponding to the fourth preset block and the coordinate values corresponding to the pixel into the first preset formula to calculate the second adjacent compensation coefficient corresponding to the channel, and substituting the first adjacent compensation coefficient, the second adjacent compensation coefficient, the original gray scale value corresponding to the channel, the first adjacent gray scale value and the second adjacent gray scale value into a second preset formula to calculate the compensation coefficient corresponding to the channel.

4. The method of claim 1, wherein the calculating a compensation gray scale value corresponding to each channel of each of the pixels according to the original gray scale value and the compensation coefficient corresponding to each channel of each of the pixels comprises:

performing summation calculation on the original gray scale value and the compensation coefficient corresponding to the channel to acquire a calculation result; and determining the calculation result as the compensation gray scale value corresponding to the channel.

5. The method of claim 1, wherein after calculating the compensation gray scale value corresponding to each channel of each of the pixels according to the original gray scale value and the compensation coefficient corresponding to each channel of each of the pixels, the method further comprises:

when the original gray scale value corresponding to any channel of any pixel is in a preset invalid gray scale interval, calculating a correction coefficient corresponding to the pixel according to the original gray scale value and the compensation gray scale value corresponding to each channel of the pixel;

calculating the product of the correction coefficient and the original gray scale value corresponding to each channel of the pixel to acquire a correction gray scale value corresponding to each channel of the pixel; and updating the compensation gray scale value corresponding to each channel of the pixel by using the correction gray scale value corresponding to each channel of the pixel.

6. The method of claim 5, wherein the calculating a correction coefficient corresponding to the pixel according to the original gray scale value and the compensation gray scale value corresponding to each channel of the pixel comprises:

determining the largest channel among a plurality of channels of the pixel corresponding to the original gray scale as a target channel; and calculating the quotient of the compensation gray scale value corresponding to the target channel and the original gray scale value corresponding to the target channel to acquire the correction coefficient corresponding to the pixel.

7. A non-transitory storage medium, comprising a stored program, wherein when the program runs, equipment, on which the non-transitory storage medium is located, is controlled to execute the method for eliminating the brightness mura defect of the liquid crystal display of claim 1.

8. A device for eliminating a brightness mura defect of a liquid crystal display, comprising a non-transitory storage medium, and one or more processors, wherein the non-transitory storage medium is coupled with the processors which are configured to execute program instructions stored in the non-transitory storage medium; and when the program instructions are run, the method for eliminating the brightness mura defect of the liquid crystal display of claim 1 is executed.

9. A device for eliminating a brightness mura defect of a liquid crystal display, the device being applied to a target liquid crystal display and comprising:

an acquisition unit configured for acquiring an image to be displayed, wherein the image to be displayed comprises a plurality of pixels;

a determination unit configured for determining a compensation coefficient corresponding to each channel of each of the pixels according to an original gray scale value corresponding to each channel of each of the pixels;

a first calculation unit configured for calculating a compensation gray scale value corresponding to each channel of each of the pixels according to the original gray scale value and the compensation coefficient corresponding to each channel of each of the pixels; and an output unit configured for outputting and displaying the image to be displayed according to the compensation gray scale value corresponding to each channel of each of the pixels;

the determination unit comprises:

a searching module configured for searching whether there is a compensation coefficient set corresponding to each of the channels according to the original gray scale value corresponding to each channel of the pixel and a preset elimination mode;

a first determination module configured for determining the compensation coefficient corresponding to the channel according to the compensation coefficient set corresponding to the channel when there is the compensation coefficient set corresponding to the channel;

a second determination module configured for acquiring a first adjacent gray scale compensation coefficient set and a second adjacent gray scale compensation coefficient set corresponding to the channel according to the original gray scale value corresponding to the channel and the preset elimination mode, and determining the compensation coefficient corresponding to the channel according to the first adjacent gray scale compensation coefficient set and the second adjacent gray scale compensation coefficient set when there is no the compensation coefficient set corresponding to the channel.

10. The device of claim 9, wherein the first determination module is specifically configured for acquiring the compensation coefficient corresponding to the channel from the compensation coefficient set corresponding to the channel when the compensation coefficient set corresponding to the channel comprises the compensation coefficient corresponding to the channel; and when the compensation coefficient set corresponding to the channel comprises the compensation coefficient corresponding to each preset block, acquiring the coordinate values corresponding to the pixel, acquiring a compensation coefficient corresponding to a first preset block, a compensation coefficient corresponding to a second preset block, a compensation coefficient corresponding to a third preset block, and a compensation coefficient corresponding to a fourth preset block from the compensation coefficient set corresponding to the channel, and substituting the compensation coefficient corresponding to the first preset block, the compensation coefficient corresponding to the second preset block, the compensation coefficient corresponding to the third preset block, the compensation coefficient corresponding to the fourth preset block, and the coordinate values corresponding to the pixel into a first preset formula to calculate the compensation coefficient corresponding to the channel, wherein the first preset block is a preset block where the pixel is located, the second preset block is a preset block on a right side adjacent to the first preset block, the third preset block is a preset block on a lower side adjacent to the first preset block, the fourth preset block is a preset block on a right side adjacent to the third preset block, and the coordinate values corresponding to the pixels are used to indicate the positions of the pixel in the first preset block.

* * * * *